United States Patent [19]

Dressler et al.

[11] 3,902,386

[45] Sept. 2, 1975

[54] ARRANGEMENT FOR CONTROL OF A BORING TOOL AND A MACHINING TOOL IN A DIRECTION DISTINCT FROM THE AXIAL DIRECTION

[75] Inventors: Bruno Dressler, Meuden; Daniel Dosne, Billancourt, both of France

[73] Assignee: Regie Nationale des Usines Renault, Billancourt, France

[22] Filed: July 25, 1974

[21] Appl. No.: 491,695

[30] Foreign Application Priority Data

July 25, 1973 France .............................. 73.27293

[52] U.S. Cl. ........................ 82/1.4; 82/18; 408/158
[51] Int. Cl. ......................... B23b 17/00; B23b 3/28
[58] Field of Search .................. 82/1.2, 1.4, 18, 19; 408/147, 153, 158, 189

[56] References Cited
UNITED STATES PATENTS

| | | | |
|---|---|---|---|
| 3,113,475 | 12/1963 | Lombardo .............................. | 82/1.4 |
| 3,121,350 | 2/1964 | Warsewa et al. .................... | 408/147 |
| 3,391,586 | 7/1968 | Van Den Kieboom ................ | 82/18 |
| 3,511,121 | 5/1970 | Meyer et al............................. | 82/19 |
| 3,771,391 | 11/1973 | Jacks ...................................... | 82/19 |
| 3,803,679 | 4/1974 | Eckhardt ................................ | 82/18 |

Primary Examiner—Harrison L. Hinson
Attorney, Agent, or Firm—Oblon, Fisher, Spivak, McClelland & Maier

[57] ABSTRACT

An arrangement for the control of a boring tool and a machining tool in a direction distinct from the axial direction, the tools being mounted on a tool holder integral with a boring head and formed of a first tool holder part and a second tool holder part movable relative to the first tool holder part, wherein a single rod is movably disposed in one of the tool holder parts for movement in a first direction and in a second reversing direction thereof and the control rod is connected to the boring tool and the machining tool to provide in succession, upon movement of the control rod in the first direction, adjustment of the position of the boring tool to compensate for deviations in the bore and retraction of the machining tool in a direction distinct from the axial direction, and upon movement of the control rod in the reverse direction, retraction of the boring tool and advancing motion of the machining tool in a reverse direction of the direction distinct from the axial direction. The machining tool may be performing dressing, chamfering or grooving operations.

13 Claims, 10 Drawing Figures

ARRANGEMENT FOR CONTROL OF A BORING TOOL AND A MACHINING TOOL IN A DIRECTION DISTINCT FROM THE AXIAL DIRECTION

BACKGROUND OF THE INVENTION

1. Field of the Invention

The present invention relates generally to the machining of bores in parts and more particularly to an arrangement for controlling a boring tool and a machining tool in a direction distinct from the axial direction.

Such a control arrangement can be used on boring machines on which a tool holder is mounted at the end of a rotating spindle to be introduced into a piece having to undergo a boring operation and a dressing, chamfering or grooving operation. The tool holder can just as well be mounted in a stationary manner on the end of the spindle in order to machine a rotating piece.

2. Description of the Prior Art

In precision boring on an automatic machine, the machining of the hole often must be completed by a dressing, chamfering or grooving operation, and, in addition, if the diameter of the hole being bored is to be determined according to precise standards, frequent modification of the radial position of the boring tool is required. These interruptions for making such modifications increase the dead time, or time when no work is being performed, and therefore the overall time for machining the parts. Moreover, the dressing, chamfering or grooving operation, performed separately on another machine, or even on the same one using means distinct from the boring means, also increases the machining time and the cost of production. The dressing, chamfering or grooving operations and that of compensating for lateral drift of a boring tool are still considered separately in this way with no regard to integrating the mechanisms or combining the controls.

The correct positioning and advancement of the tools can be provided by manual control as well.

SUMMARY OF THE INVENTION

The object of the present invention therefore is to provide a single control device mounted on a tool holder being connected to electronic means of decision and control thereof.

Another object of the present invention is to provide for use in machining as characterized herein, a control arrangement and machining apparatus having improved efficiency and precision capabilities over prior known devices of the same type.

The arrangement of the present invention permits, on the one hand, automatic correction of the boring tool's radial position in order to compensate for deviations due to multiple mechanical phenomena caused by thermal conditions and wear, and, on the other hand, to effect simultaneously the linear displacement of the dressing, chamfering or grooving tool and the retraction of the boring tool to prevent scratching of the piece during the return of the tool holder.

According to at least one aspect of the present invention therefore, the foregoing objects are achieved by a control arrangement which comprises a single control rod having two modes of movement, the rod being connected to the boring and machining tools by means assuring in succession for one mode of motion, the adjustment of the position of the boring tool to compensate for deviation in the boring, and for the other mode of motion, the retraction of the boring tool and the displacement of the machining tools in a direction distinct from the axial direction.

A tool holder using such a control device is very simple in construction and the association in a single means of control of the two operations permits a significant saving of time and a reduction of tooling cost. Simultaneous retraction of the boring tool and dressing, chamfering or grooving entails the elimination of dead time. Further, using such a control permits very delicate advancement of the boring tool and therefore affords precise compensation.

BRIEF DESCRIPTION OF THE DRAWINGS

Various other objects, features and attendant advantages of the present invention will be more fully appreciated as the same becomes better understood from the following detailed description, when considered in connection with the accompanying drawings in which.

DETAILED DESCRIPTION OF THE PREFERRED EMBODIMENTS

Figure 1:
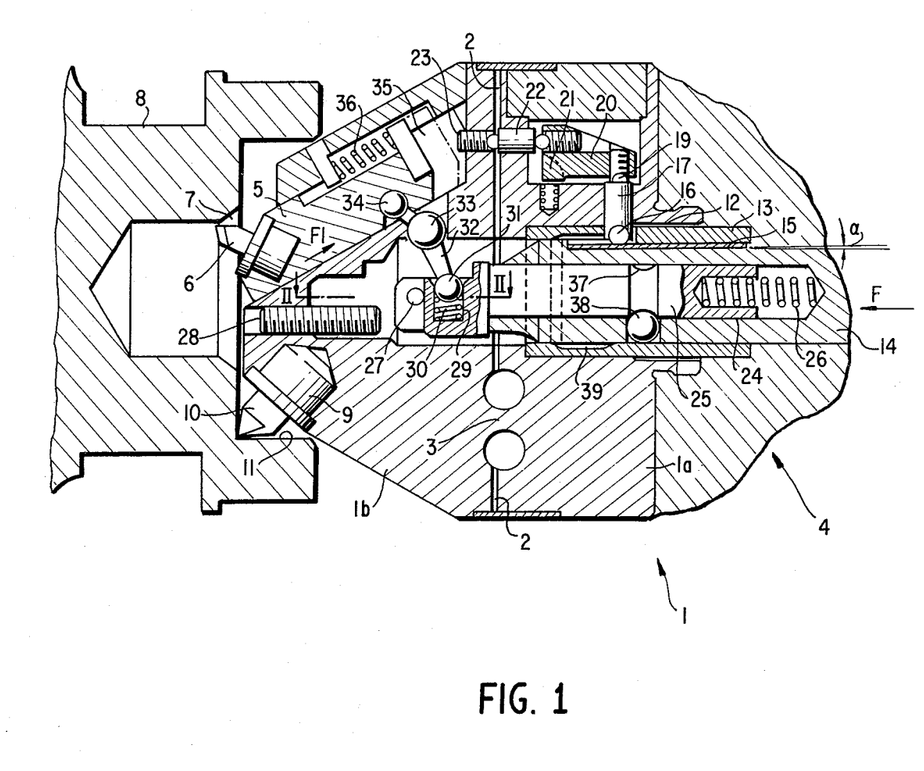
FIG. 1 is an axial section taken along the line I—I of FIG. 2 of a tool holder provided with a control device with a sliding rod in accordance with the present invention.
Figure 2:
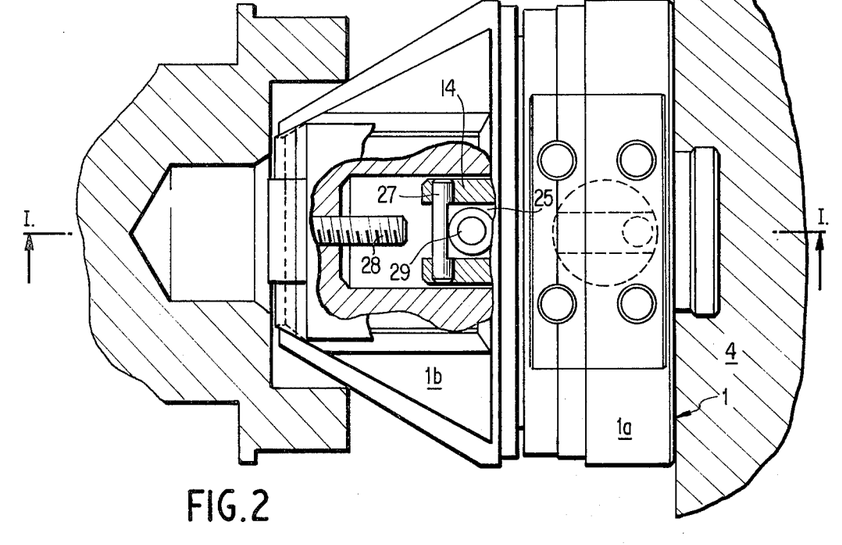
FIG. 2 is a top view of the tool holder shown in FIG. 1.

Referring now to the drawings, and more particularly to FIGS. 1 and 2 thereof, a tool holder 1 is shown which consists of two parts 1a and 1b being generally separated by a gap 2 but connected by a small zone 3 of low resistance to deformation, constituting a point of rotation for the part 1b to pivot with respect to the part 1a which is fixedly mounted on a boring head 4.

The pivoting part 1b carries a cutter holder 5 on which is mounted a chamfer cutter 6 for producing a chamfer 7 on a part 8 being machined and a cutter holder 9 on which is mounted a boring cutter 10 for producing a boring 11 in the part 8.

The tool holder 1 has an axial boring 12 in which is located a control rod 14 which slides therein by the intermediary of a sleeve 13 under the control of known means, not shown in the drawings.

The control rod 14 has an inclined surface or ramp 15 having a slope angle $\alpha$ with respect to its axis against which one end of a push rod 17 is pressed by way of a ball 16. The rod 17 is mounted with its axis being perpendicular to that of the control rod and so that it is slidable along its axis in the fixed part 1a of the tool holder. The other end of the rod 17 presses by way of a ball 19 against one end of a lever 20 mounted so as to pivot about a point of support and rotation 21. At its other end, the lever 20 presses against an adjustable stop consisting of a self-locking screw 23 screwed into a tapped hole in the pivoting part 1b of the tool holder through a push rod 22 slidably disposed in the fixed part 1a along a line parallel to the axis of the control rod 14.

When the control rod 14 slides in the direction of the arrow F, the push rod 17 is thus raised because of the advancing inclined surface 15 operating thereagainst, thereby causing lever 20 to pivot in a counterclockwise fashion about point 21, so that the rod 22 is also pushed in the direction of the arrow F against the screw 23 to cause the part 1b of the tool holder to pivot about the zone 3, thus altering the radial position of the cutter holder 9 to permit machining of the bore 11 by means of the boring cutter 10.

When the control rod 14 moves in the opposite direction from that designated by the arrow F, the push rod 17, the lever 20 and the rod 22 reverse their motions so that part 1b of the tool holder pivots in the opposite direction about zone 3 and thus disengages the boring cutter 10.

In one end of the control rod 14 is a blind axial hole 24 in which slides a pin 25 being acted on by a spring 26 resting against the bottom of the hole 24. The pin 25 can be brought to a stop against either a peg 27 integral with the fork-shaped end of the control rod or a stop formed by a bolt 28 screwed in an adjustable manner into a tapped hole in the movable part 1b of the tool holder.

At its one end, the pin 25 has a seat 29 in which there is disposed a ball 31 acted on by a spring 30 and integral with one end of a lever 32 mounted so as to pivot in its middle section about a ball 33 held in a socket in the movable part 1b of the tool holder. The lever 32 has a ball 34 at its other end held in a corresponding socket of the chamfering cutter holder 5 which slides in an inclined hole 35 of the pivoting part 1b, the cutter holder 5 being acted on by a spring 36.

The pin 25 also has a groove 37 which engages a ball 38, situated in a hole in the rod 14 opening into the bore or hole 24, so as to carry along the pin with the rod during sliding of the rod except in the part of the motion of the rod 14 corresponding to a groove 39 provided in the sleeve 13 when the ball 38 drops thereinto and disengages from the groove 37 in the pin 25 so as to free the pin 25 from the control rod 14.

The displacement of the rod 14 in the direction of the arrow F along with pin 25 joined therewith, as shown in FIG. 1, causes the lever 32 to pivot clockwise about the ball 33 and the chamfering cutter holder 5 to slide in the direction of arrow $F_1$, thus retracting the chamfering cutter 6 while the boring cutter 10 is in position for machining.

As soon as the ball 38 drops into the groove 39, the pin 25 is released from rod 14, which continues its own motion in the direction of arrow F, while the pin 25 is forced by spring 26 against the bolt 28 which limits the retraction of cutter holder 5.

Upon the return of the control rod 14 in the opposite direction from that indicated by arrow F, it carries along the pin 25 after a certain point by means of the integral peg 27 therein, which encounters the end of the pin 25. This results in a pivoting of the lever 32 in the reverse or counterclockwise direction about ball 33 and a sliding of the chamfering cutter holder 5 in the opposite direction from that indicated by the arrow $F_1$, so that the dressing cutter is advanced for machining the chamfer 7.

At a certain point, the ball 38 leaves the groove 39 and re-engages the groove 37 in pin 25, thus reuniting pin 25 and rod 14 for movement together.

Upon the return of control rod 14 in the opposite direction from that indicated by the arrow F, the boring cutter is in the retracted position, as has already been described. The mode of interaction between pin 25 and control rod 14 permits, when the ball 38 is in groove 39, the holding pin 25 to be held stationary against the bolt 28, and effecting the placement into working position and the retraction therefrom of the boring cutter 10, while keeping the chamfering cutter holder 5 fixed.

Figure 3:
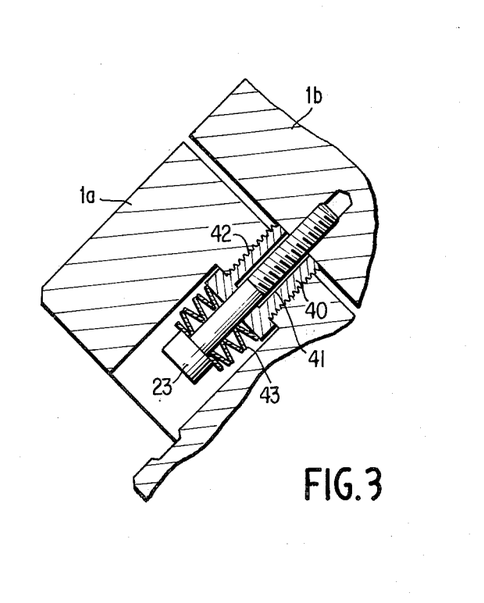
FIG. 3 is a section of another embodiment of a stop of the device shown in FIGS. 1 and 2, permitting chamfering at a constant angle.

In FIG. 3, is shown a modification of the embodiment of the stop at the location where push rod 22 and the screw 23 meet, permitting the making of the chamfer 7 in the machined part 8 with a strictly constant angle.

This stop consists of a sleeve 40 having a bore 41 therein through which a bolt 23 passes and is screwed into the pivoting part 1b of the tool holder, the sleeve 40 being itself screwed into a tapped hole 42 of the fixed part 1a, with the pivoting part 1b resting against the sleeve 40, which just slightly extends from the surface of the fixed part 1a.

With the boring operation finished, the pivoting part 1b, with the help of the spring 43, moves toward the fixed part 1a of the tool holder in order to reassume its initial position ready for the chamfering operation, the pivoting part 1b resting against the sleeve 40 of the stop. This position being established before chamfering avoids an inclination of the chamfering cutter holder 5 depending on the pivoting of the forward part of the tool holder.

Figure 4:
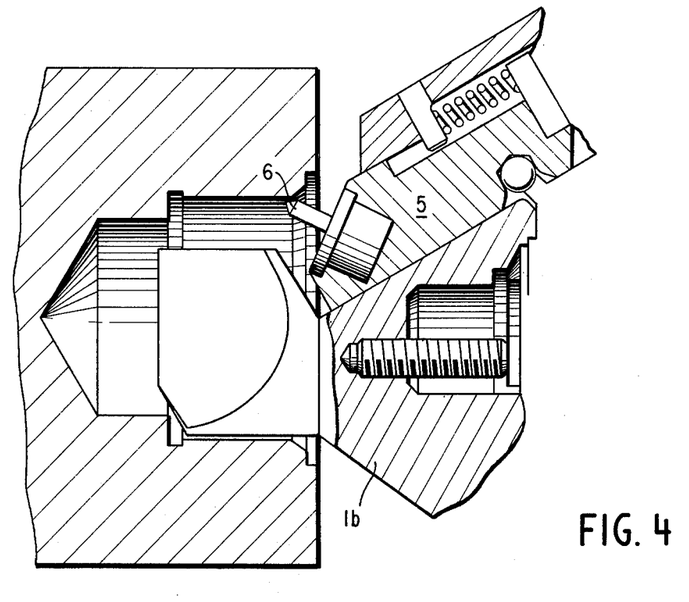
FIGS. 4 and 5 are views of a modified tool holder in which the boring tool is shifted to be disposed 90° from the chamfering tool.
Figure 5:
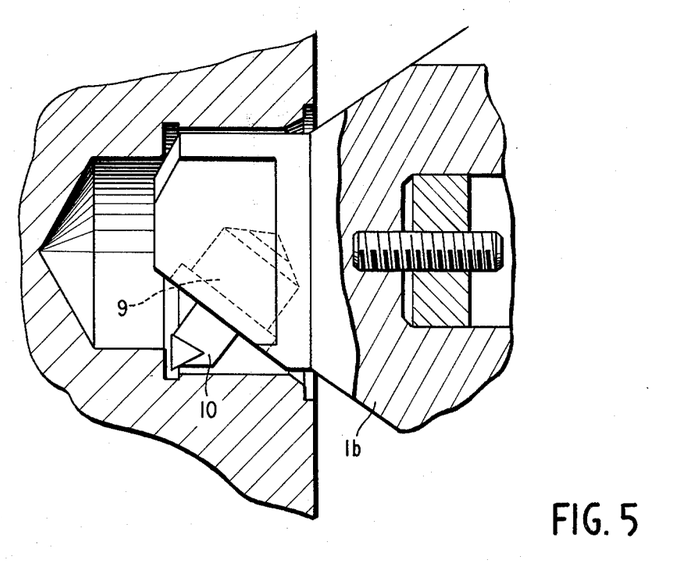

In the embodiment shown in FIGS. 1 and 2, the boring cutter holder 9 and the chamfering cutter holder 5 are situated in the same axial plane. In FIGS. 4 and 5, another embodiment is shown in which the boring cutter holder 9 is shifted by 90° with respect to the chamfering cutter holder 5.

Figure 6:
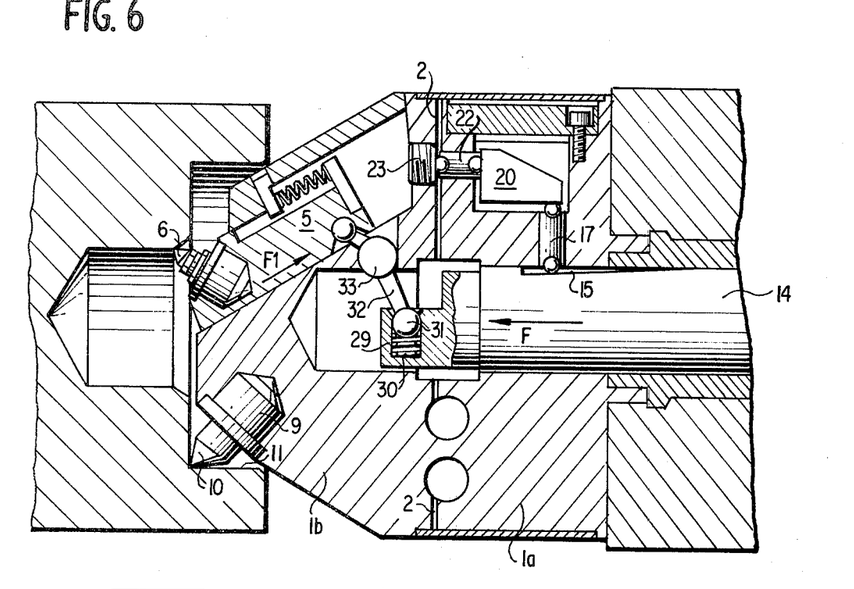
FIG. 6 is an axial section of another simplified embodiment of the tool holder shown in FIGS. 1 and 2.

FIG. 6 shows a modification of the tool holder of FIGS. 1 and 2 in which the pin 25 and the means of uniting this pin with control rod 14 are eliminated.

Consequently, the ball 31 of lever 32 controlling the chamfering cutter holder 5 is located in a radial hole 29 formed in the end of the control rod 14.

This simplified version of the control arrangement permits the same functioning as that described above for FIGS. 1 and 2, that is, for a displacement of the rod 14 in the direction of the arrow F, positive compensation of the boring 11 and the return of the cutter holder 5 in the direction of the arrow $F_1$. For motion of rod 14 in the direction opposite to that indicated by the arrow F, the boring tool 10 is retracted and the chamfering tool 6 is advanced.

Figure 7:
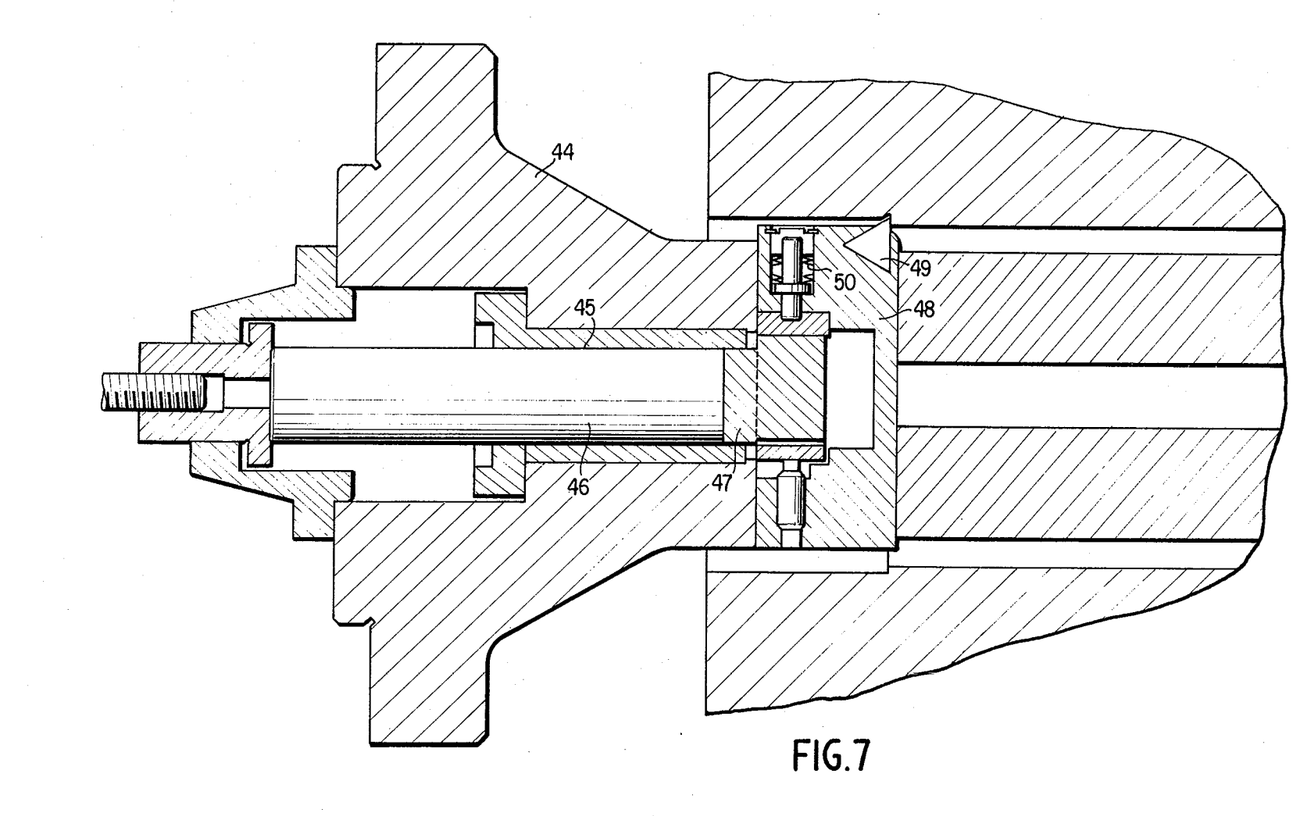
FIG. 7 is an axial section of a tool holder with another embodiment of the control device with a sliding rod.

In FIG. 7 is shown a different embodiment of the control arrangement of the present invention, with one means and a single control also realizing the triple function of compensating for the deviation of a boring, retracting of a boring tool, a chamfer dressing tool or a grooving tool, and displacing a machining tool in a direction distinct from the axial direction. This arrangement comprises a tool holder 44 having an axial hole 45 in which there slides a control rod 46 having at one end thereof straight channels 47 inclined with respect to the axis of the tool holder 44, and enabling through the intermediary of a complementary system of channels the transformation of the rectilinear axial motion of the rod 46 into a rectilinear radial motion of the dressing cutter holder 48 and consequently of the dressing cutter 49.

A spring arrangement 50 maintains the channels in mesh and eliminates play.

Figure 8:
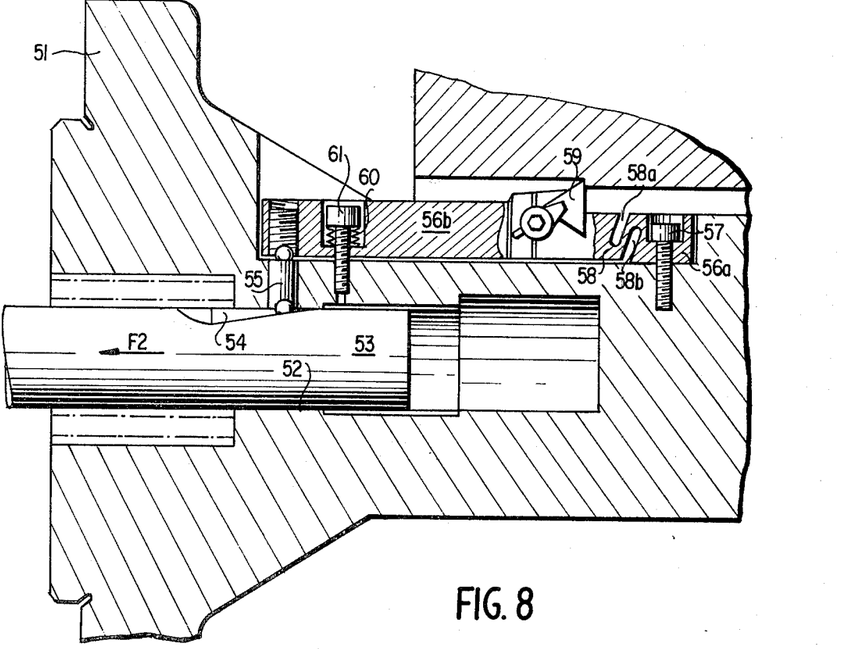
FIG. 8 is an axial section of a tool holder with a pivoting lever for control of the tool.

In FIG. 8, another modification of a tool control is shown, being mounted on a tool holder 51 having an axial hole 52 in which there slides back and forth a control rod 53.

As in the preceding examples, the control rod 43 has an inclined surface or ramp 54 on which rests one end of a push rod 55, the other end of which presses against the pivoting part 56b of a lever, the fixed part 56a of which is fastened to the tool holder by a screw 57. The center of rotation 58 of the pivoting part 56b is a weakened zone, or zone of least resistance to deformation, and is defined by slots 58a, 58b.

The pivoting part 56b of the lever which holds a boring cutter 59 is restrained by a spring 60 located between the head of a screw 61 fixed to the tool holder and the lever 56b.

Displacement of the control rod 53 in the direction indicated by the arrow $F_2$ raises the push rod 55, thus forcing the part 56b of the lever to pivot clockwise about the point of rotation 58 so as to engage the cutter 59.

The displacement of the rod 53 in the direction opposite that indicated by the arrow $F_2$ causes push rod 55 to drop and the part 56b of the lever to pivot in the reverse sense, or in a counterclockwise direction, and thus disengages the cutter 59.

Figure 9:
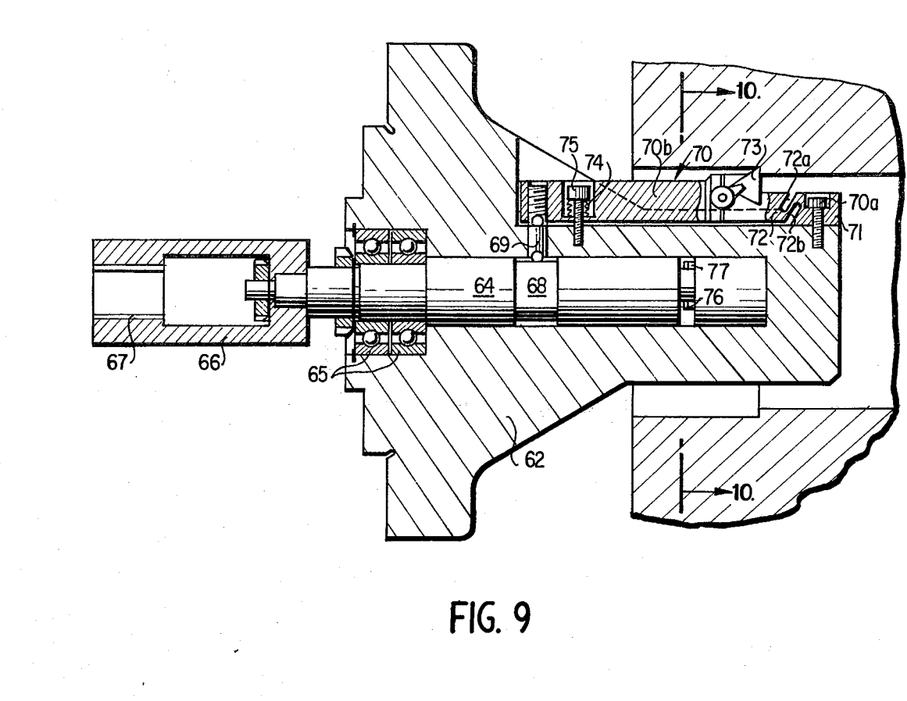
FIG. 9 is a section of a tool holder with a rotating control rod.
Figure 10:
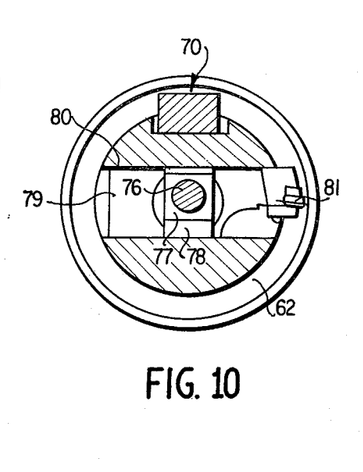
FIG. 10 is a sectional view taken along the line X—X of FIG. 9.

FIGS. 9 and 10 show yet another embodiment of the control arrangement of the present invention comprising a tool holder 62 having an axial hole 63 in which is mounted so as only to pivot, a control rod 64 supported by two oblique-contact ball bearings 65, the control rod being tied in rotation to a stepping control arrangement through a sleeve 66 having a helicoidal ramp 67. This control rod 64 has in its central section a crank 68 which actuates a push rod 69 in contact with a pivoting part 70b of a lever 70, the fixed part 70a of which is attached to the tool holder by a screw 71. The lever 70 has a center of rotation 72, or a deformable zone of least resistance to deformation, defined by slots 72a, 72b. The pivoting part 70b of the lever which carries a boring cutter 73 is restrained by a spring 74 located between the head of a screw 75 in the tool holder and the pivoting part 70b of the lever.

When the control rod 64 rotates, the crank 68 moves the rod 69 radially, causing pivotal motion in one sense or the other of the part 70b of the lever about the center of rotation 72, and thus changing the position of the boring cutter 73 in the truing operation on the bore.

At the one end of the control rod 64, there is a second crank 76 which rotates freely in the hole through a disk 77 which can slip around in a groove 78 in a tool carrier 79 which can itself slide in a slot 80 in tool holder 62. At one end of carrier 79 is a dressing cutter 81.

Rotation of the rod 64 thus produces a radial movement of the dressing cutter 81.

As can be readily appreciated, a tool holder furnished with the control arrangement of the present invention can be used on boring machines for mass production or on special machines when a precision-diameter boring operation must be completed by a chamfering, dressing or grooving operation requiring geometrical exactness or fine surface finish.

The arrangement of the present invention for compensating for deviation in the bore permits overcoming the effects of cutter wear, adhering of cuttings, and the differences in material or unequal quality of the blanks.

An example of application, as may readily be recognized, is machining of the centers of internal combustion engine crankshafts.

Obviously, many modifications and variations of the present invention are possible in light of these teachings. It is therefore to be understood that within the scope of the appended claims, the invention may be practiced otherwise than as specifically described herein.

What is claimed as new and desired to be secured by letters patent of the United States is:

1. An arrangement for the control of a boring tool and a machining tool in a direction distinct from the axial direction, said tools being mounted on a tool holder integral with a boring head and formed of a first tool holder and a second tool holder part movable relative to said first tool holder part, comprising:

a single control rod movably disposed in at least one of said tool holder parts for movement in a first direction and in a second direction being the reverse of said movement in said first direction; and means connecting said control rod to said boring tool and to said machining tool being operable to provide in succession, upon movement of said control rod in said first direction, adjustment of the position of said boring tool to compensate for deviations in the bore and retraction of said machining tool in a direction distinct from the axial direction, and upon movement of said control rod in said second direction, retraction of said boring tool and advancing motion of said machining tool in a reverse direction of said direction distinct from the axial direction.

2. An arrangement for control of a boring tool and a machining tool according to claim 1, wherein said means connecting said control rod to said boring tool and said machining tool comprises:

an inclined surface on said control rod;

a first push rod slidably disposed in said first tool holder part and operatively engaging said second tool holder part for effecting motion thereof relative to said first tool holder part.

3. An arrangement for control of a boring tool and a machining tool according to claim 2, wherein said means connecting said control rod to said boring tool and said machining tool further comprises:

a second push rod slidably disposed in said first tool holder part and resting against said movable second tool holder part of the tool holder through an adjustable stop therein, said second push rod being operatively engaged with said first push rod.

4. An arrangement for control of a boring tool and a machining tool according to claim 2, wherein said means connecting said control rod to said boring tool and said machining tool further comprises:

a second push rod slidably disposed in said first tool holder part and resting against a stop adjustably mounted in said second tool holder part and extending between said second tool holder part and said first tool holder part;

a sleeve disposed about said stop being secured to said first tool holder part and extending therefrom in the direction of said second tool holder part for contacting the same and maintaining a predetermined gap therebetween; and an elastic means interposed between said stop and said sleeve for urging said stop in the direction of said second push rod.

5. A control arrangement for control of a boring tool and a machining tool according to claim 2, wherein said means connecting said control rod to said boring tool and said machining tool comprises:

a holder for said machining tool being slidable within said second tool holder part;

a lever composed of ball joints disposed at its ends and intermediate thereof, one of said end ball joints being seated within an opening in one end of said control rod, another of said end ball joints being seated within an opening in said machining tool holder, and the intermediate ball joint being seated in a socket in said second tool holder part; and elastic means urging said ball joint in said control rod to move outwardly therefrom.

6. A control arrangement for control of a boring tool and a machining tool according to claim 5, further comprising:

said control rod having an axial bore in one end;

a pin slidably disposed in said axial bore of said control rod;

means resiliently urging said pin to move outwardly of said axial bore of said control rod;

said pin being selectively stoppable at the other end against an adjustable bolt stop mounted in said second tool holder part of the tool holder and against a peg fastened to the end of said control rod;

said pin having a circumferentially disposed groove which engages a ball held in a hole in said control rod being slidable therewith;

a sleeve in which said control rod is slidably received, said sleeve having a groove on its inner periphery adjacent one end thereof;

said ball slidable with said control rod and said pin being engagable with said groove of said sleeve;

and said opening in said one end of said control rod for receiving a ball joint of said lever being an opening in said pin slidably disposed in said control rod.

7. A control arrangement for control of a boring tool and a machining tool according to claim 1, wherein said boring tool and said machining tool are situated in the same axial plane.

8. A control arrangement for control of a boring tool and a machining tool according to claim 1, wherein said boring tool is located in an axial plane perpendicular to that of said machining tool.

9. A control arrangement for control of a boring tool and a machining tool according to claim 1, characterized by said axially sliding control rod having at one end thereof straight channels inclined with respect to the axis of the tool-holder head and cooperable with complementary channels on the boring tool holder mounted in radially movable fashion on the tool holder.

10. A control arrangement for control of a boring tool and a machining tool according to claim 1, wherein said means connecting said control rod to said boring tool and said machining tool comprises:

at least one inclined surface on said control rod;

a push rod slidably disposed in second tool holder part;

a lever restrained by a spring and being secured at one end to said first tool holder part;

said lever being engageable with said push rod for being pivoted about said one end; and said lever carrying said boring tool.

11. A control arrangement for control of a boring tool and a machining tool according to claim 1, wherein said movable control rod is rotatable in two directions, one of which produces said retraction of said boring tool and advancing movement of said machining tool, and the other direction of rotation effects said positive compensation of said bore and the return of said machining tool.

12. A control arrangement for control of a boring tool and a machining tool according to claim 11 characterized by said rotatable control rod having a crank contacting one end of a push rod slidable radially within a hole in said tool holder, said rod pressing at its other end against a spring biased lever, the fixed part of which is fastened to said tool holder and the intermediate pivoting part of which carries a boring tool.

13. A control arrangement for control of a boring tool and a machining tool according to claim 11, characterized by said rotatable control rod having a crank on which is rotatably mounted a disk- slidable in a groove in said machining tool carrier, said tool carrier itself being slidable radially on said tool holder.

* * * * *